(12) United States Patent
Mutz et al.

(10) Patent No.: US 9,264,358 B2
(45) Date of Patent: *Feb. 16, 2016

(54) ALIAS RESOURCE RECORD SETS

(71) Applicant: Amazon Technologies, Inc., Seattle, WA (US)

(72) Inventors: Darren H. Mutz, Seattle, WA (US); John Cormie, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,364

(22) Filed: Nov. 10, 2014

(65) Prior Publication Data

US 2015/0134848 A1   May 14, 2015

Related U.S. Application Data

(63) Continuation of application No. 13/247,326, filed on Sep. 28, 2011, now Pat. No. 8,886,750.

(51) Int. Cl.
*H04L 12/741* (2013.01)
*G06F 15/16* (2006.01)
*H04L 29/12* (2006.01)

(52) U.S. Cl.
CPC ............. *H04L 45/745* (2013.01); *G06F 15/16* (2013.01); *H04L 61/1511* (2013.01)

(58) Field of Classification Search
USPC ........... 709/217; 726/2, 21, 36; 713/150, 163, 713/181; 380/255, 264, 276
See application file for complete search history.

(56) References Cited

U.S. PATENT DOCUMENTS

| 7,574,508 | B1* | 8/2009 | Kommula | 709/226 |
|---|---|---|---|---|
| 8,886,750 | B1 | 11/2014 | Mutz et al. | |
| 2002/0087722 | A1* | 7/2002 | Datta et al. | 709/239 |
| 2010/0250668 | A1* | 9/2010 | Toebes et al. | 709/203 |
| 2011/0295988 | A1 | 12/2011 | LeJouan | |
| 2013/0103784 | A1* | 4/2013 | Lyon | 709/217 |

* cited by examiner

*Primary Examiner* — Jason K. Gee
*Assistant Examiner* — Sharif E Ullah
(74) *Attorney, Agent, or Firm* — Knobbe, Martens, Olson & Bear, LLP

(57) ABSTRACT

Generally described, the present disclosure is directed to managing request routing functionality corresponding to resource requests for one or more resources associated with a content provider. A service provider may assign an alias resource records that point to another alias resource record or to an IP address. A DNS server of the service provider may receive a request to resolve a DNS query for a domain for which the DNS server is authoritative. The DNS server determine that the DNS query corresponds to an alias record and may resolve the DNS query according to the data of the alias record.

20 Claims, 7 Drawing Sheets

ALIAS RESOURCE RECORD SETS

RELATED APPLICATIONS

Incorporation by Reference to any Priority Applications

Any and all applications for which a foreign or domestic priority claim is identified in the Application Data Sheet as filed with the present application are incorporated by reference under 37 CFR 1.57 and made a part of this specification.

BACKGROUND

Generally described, computing devices and communication networks can be utilized to exchange information. In a common application, a computing device can request content from another computing device via the communication network. For example, a user at a personal computing device can utilize a software browser application to request a Web page from a server computing device via the Internet. In such embodiments, the user computing device can be referred to as a client computing device and the server computing device can be referred to as a content provider.

Content providers are generally motivated to provide requested content to client computing devices often with consideration of efficient transmission of the requested content to the client computing device or consideration of a cost associated with the transmission of the content. For larger scale implementations, a content provider may receive content requests from a high volume of client computing devices which can place a strain on the content provider's computing resources. Additionally, the content requested by the client computing devices may have a number of components, which can further place additional strain on the content provider's computing resources.

In some embodiments, the content providers can utilize one or more service providers, such as content delivery network service providers and network storage service providers, to provide services related to the delivery of requested content. In a similar manner, service providers are generally motivated to provide services, such as hosting DNS request processing services or providing content to client computing devices, often with consideration of the efficiency and cost associated with the requested services. For example, service providers often consider factors such as latency of delivery of requested content in processing client computing device requests (either DNS queries or content requests) in order to meet service level agreements or to generally improve the quality of delivered service.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
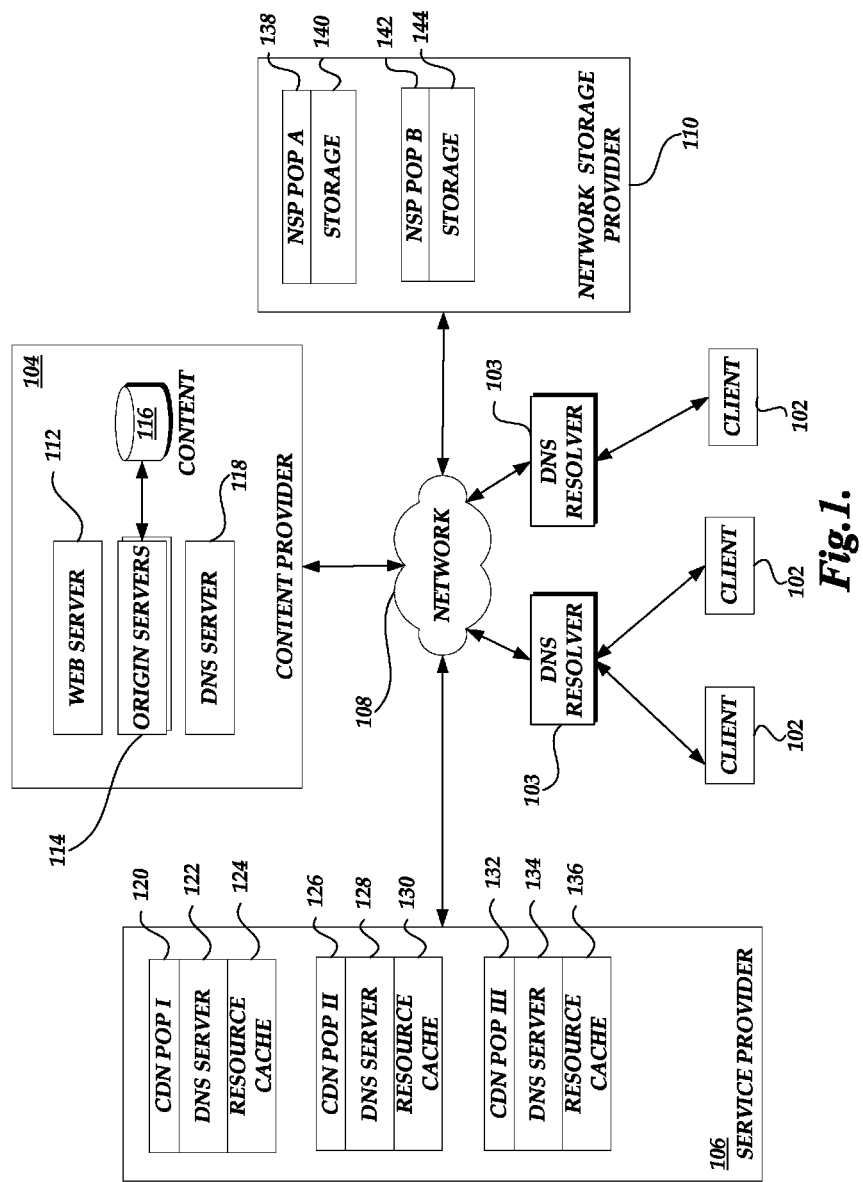
FIG. 1 is a block diagram illustrative of content delivery environment including a number of client computing devices, a content provider, a network storage provider, and a content delivery network service provider.

Generally described, the present disclosure is directed to managing requesting routing functionality corresponding to resource requests for one or more resources associated with a content provider. Aspects of the disclosure will be described with regard to the management and processing request routing functionality by a service provider, such as a content delivery network ("CDN") service provider, on behalf of an entity requesting the request routing functionality, such as a content provider. Illustratively, the request routing functionality can correspond to the processing, by computing devices associated with the service provider, such as a DNS server component associated with a specific network address, of domain name service ("DNS") requests on behalf of a content provider. The service provider DNS server components resolve the received DNS queries by identifying a network address of a computing device that will provide requested resources, such as a cache component. More specifically, in illustrative embodiments, the DNS server components may resolve the received DNS queries for a specified domain through a series of references, or aliases, to other domains that provide information utilized to resolve the received DNS query.

By way of an illustrative example, a DNS server may receive a DNS query to resolve a domain name related to a first specified domain (e.g., www.sampledomain.com). Rather than resolving the DNS query with IP address information maintained for the first specified domain, the receiving DNS server may be configured such that the first domain is referenced to a second domain (e.g., www.aliasdomain.com). As such, the DNS server can then utilize information maintained for the second domain to resolve the DNS query corresponding to the first domain. More specifically, the DNS server can resolve the DNS query corresponding to the first domain by providing, for example, IP address information associated with second domain. Accordingly, the first domain name may act as an alias to the second domain name. In another illustrative embodiment, it can be possible that the second domain name may reference a third domain (e.g., www.aliaschain.com). In such embodiments, the third domain acts as an alias for the second domain.

In another aspect of the present application, a DNS server component may receive a resource record set alias definition. The resource record set alias definition may comprise a name, a type, and a target. The target may comprise a hosted zone identifier and a target name. The target name may be a domain name that resolves to an IP address, or it may resolve to another resource record set alias. When the DNS server component receives a DNS query, it may resolve the request using the received resource record set alias definitions.

Although various aspects of the disclosure will be described with regard to illustrative examples and embodiments, one skilled in the art will appreciate that the disclosed embodiments and examples should not be construed as limiting. For example, the present disclosure may be described with regard to request routing services provided by a service provider, such as a CDN service provider, that may provide additional services and functionality including network-based storage services, caching services, and content delivery services. However, one skilled in the relevant art will appreciate that a service provider need not provide all, or any, of the additional services or functionality that may be associated with some service providers, such as a CDN service provider. Likewise, although the present application will be discussed with regard to a content provider as the requestor of services, such as the DNS request processing services, one skilled in the relevant art will appreciate that the requestor of the service need not provide any additional functionality that may be otherwise attributed to content providers. Furthermore, although the present application will be discussed with respect to client computing devices requesting content for display in a web browser, one skilled in the relevant art will appreciate that the systems, methods and processes described for resolving DNS queries may be applied to any client application that may make use of the DNS system to resolve DNS queries. Examples include, but are not limited to, networking applications (e.g., network chat applications), email applications, distributed gaming applications, voice over IP applications, video chat applications, general client-server applications or general distributed computing applications, and the like.

FIG. 1 is a block diagram illustrative of content delivery environment 100 for the managing registration of content provider with a service provider, such as a CDN service provider, and subsequent processing of at least a portion of content requests on behalf of the content provider. As illustrated in FIG. 1, the content delivery environment 100 includes a number of client computing devices 102 (generally referred to as clients) for requesting content from a content provider, a network storage provider 110, and/or a service provider 106. In an illustrative embodiment, the client computing devices 102 can correspond to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

As also illustrated in FIG. 1, each client computing device 102 utilizes some type of local DNS resolver component 103, such as a DNS Name server, that generates the DNS queries attributed to the client computing device. In one embodiment, the local DNS resolver component may be provide by an enterprise network to which the client computing device 102 belongs. In another embodiment, the local DNS resolver component 103 may be provided by an Internet Service Provider (ISP) that provides the communication network connection to the client computing device 102. As will be described in greater detail below, in an illustrative embodiment, the DNS resolver components 103 can be configured such that at least some portion of the received DNS queries may be resolved through the use of alias resource record sets.

The content delivery environment 100 can also include a content provider 104 in communication with the one or more client computing devices 102 via the communication network 108. The content provider 104 illustrated in FIG. 1 corresponds to a logical association of one or more computing devices associated with a content provider. Specifically, the content provider 104 can include a web server component 112 corresponding to one or more server computing devices for obtaining and processing requests for content (such as Web pages) from the client computing devices 102. The content provider 104 can further include an origin server component 114 and associated storage component 116 corresponding to one or more computing devices for obtaining and processing requests for network resources. One skilled in the relevant art will appreciate that the content provider 104 can be associated with various additional computing resources, such additional computing devices for administration of content and resources and the like. Additionally, although the origin server component 114 and associated storage component 116 are logically associated with the content provider 104, the origin server component 114 and associated storage components 116 may be geographically distributed throughout the communication network 108 in a manner to best serve various demographics of client computing devices 102. Still further, although illustrative components have been described with regard to the content provider 104, a content provider may have any configuration of components associated with a domain addressable on the communication network 108.

As further illustrated in FIG. 1, the content provider 104 can be associated with one or more DNS name server components 118 that are operative to receive DNS queries related to registered domain names associated with the content provider. The one or more DNS name servers can be authoritative to resolve client computing device DNS queries corresponding to the registered domain names of the content provider 104. A DNS name server component is considered to be authoritative to a DNS query if the DNS name server can resolve the query by providing a responsive IP address. As will be explained in greater detail below, in accordance with illustrative embodiments, at least a portion of the request routing functionality provider the DNS name server components 118 will be provided by a service provider on behalf of the content provider 104.

With continued reference to FIG. 1, the content delivery environment 100 can further include a service provider 106 in communication with the one or more client computing devices 102, the content provider 104, and the network storage provider 110 via the communication network 108. The service provider 106 illustrated in FIG. 1 corresponds to a logical association of one or more computing devices associated with a service provider. Specifically, the service provider 106 can include a number of Point of Presence ("POP") locations 120, 126, 132 that correspond to nodes on the communication network 108. Each POP 120, 126, 132 includes a DNS component 122, 128, 134 made up of a number of DNS server computing devices for resolving DNS queries from the client computers 102. Each POP 120, 126, 132 also optionally includes a resource cache component 124, 130, 136 made up of a number of cache server computing devices for storing resources from content providers or network storage providers and transmitting various requested resources to various client computers. The DNS components 122, 128, 134 and the resource cache components 124, 130, 136 may further include additional software and/or hardware components that facilitate communications including, but not limited, load balancing or load sharing software/hardware components. In some embodiments, the resource cache components 124, 130, 136 may store information, such as a table, that corresponds alias resource records sets.

In an illustrative embodiment, the DNS component 122, 128, 134 and resource cache component 124, 130, 136 are considered to be logically grouped, regardless of whether the components, or portions of the components, are physically separate. Additionally, although the POPs 120, 126, 132 are illustrated in FIG. 1 as logically associated with the CDN service provider 106, the POPs will be geographically distributed throughout the communication network 108 in a manner to best serve various demographics of client computing devices 102. Additionally, one skilled in the relevant art will appreciate that the service provider 106 can be associated with various additional computing resources, such additional computing devices for administration of content and resources, and the like.

With further continued reference to FIG. 1, the content delivery environment 100 can also include a network storage provider 110 in communication with the one or more client computing devices 102, the service provider 106, and the content provider 104 via the communication network 108. The network storage provider 110 illustrated in FIG. 1 also corresponds to a logical association of one or more computing devices associated with a network storage provider. Specifically, the network storage provider 110 can include a number of network storage provider Point of Presence ("NSP POP") locations 138, 142 that correspond to nodes on the communication network 108. Each NSP POP 138, 142 includes a storage component 140, 144 made up of a number of storage devices for storing resources from content providers which will be processed by the network storage provider 110 and transmitted to various client computers. The storage components 140, 144 may further include additional software and/or hardware components that facilitate communications including, but not limited to, load balancing or load sharing software/hardware components.

In an illustrative embodiment, the storage components 140, 144 are considered to be logically grouped, regardless of whether the components, or portions of the components, are physically separate. Additionally, although the NSP POPs 138, 142 are illustrated in FIG. 1 as logically associated with the network storage provider 110, the NSP POPs will be geographically distributed throughout the communication network 108 in a manner to best serve various demographics of client computing devices 102. Additionally, one skilled in the relevant art will appreciate that the network storage provider 110 can be associated with various additional computing resources, such additional computing devices for administration of content and resources, DNS name servers, and the like.

Even further, one skilled in the relevant art will appreciate that the components of the network storage provider 110 and components of the service provider 106 can be managed by the same or different entities. One skilled in the relevant art will also appreciate that the components and configurations provided in FIG. 1 are illustrative in nature. Accordingly, additional or alternative components and/or configurations, especially regarding the additional components, systems and subsystems for facilitating communications may be utilized. Specifically, one skilled in the relevant art will appreciate the network storage provider 110 may be omitted from the content delivery environment 100.

Figure 3A:
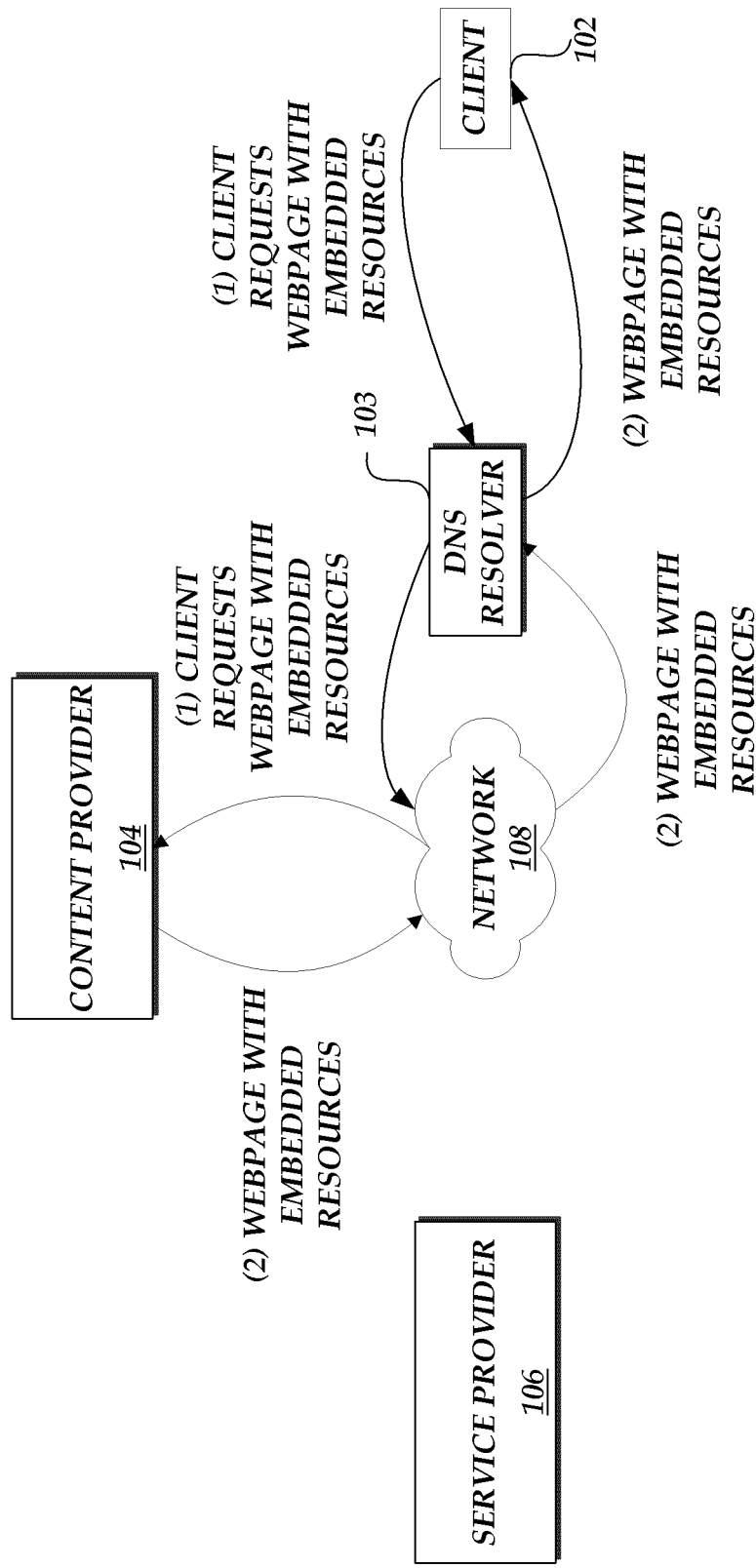
FIGS. 3A, 3B and 3C are block diagrams of the content delivery environment of FIG. 1 illustrating the data flow for a request from a client for a webpage and its associated embedded resources.
Figure 3B:
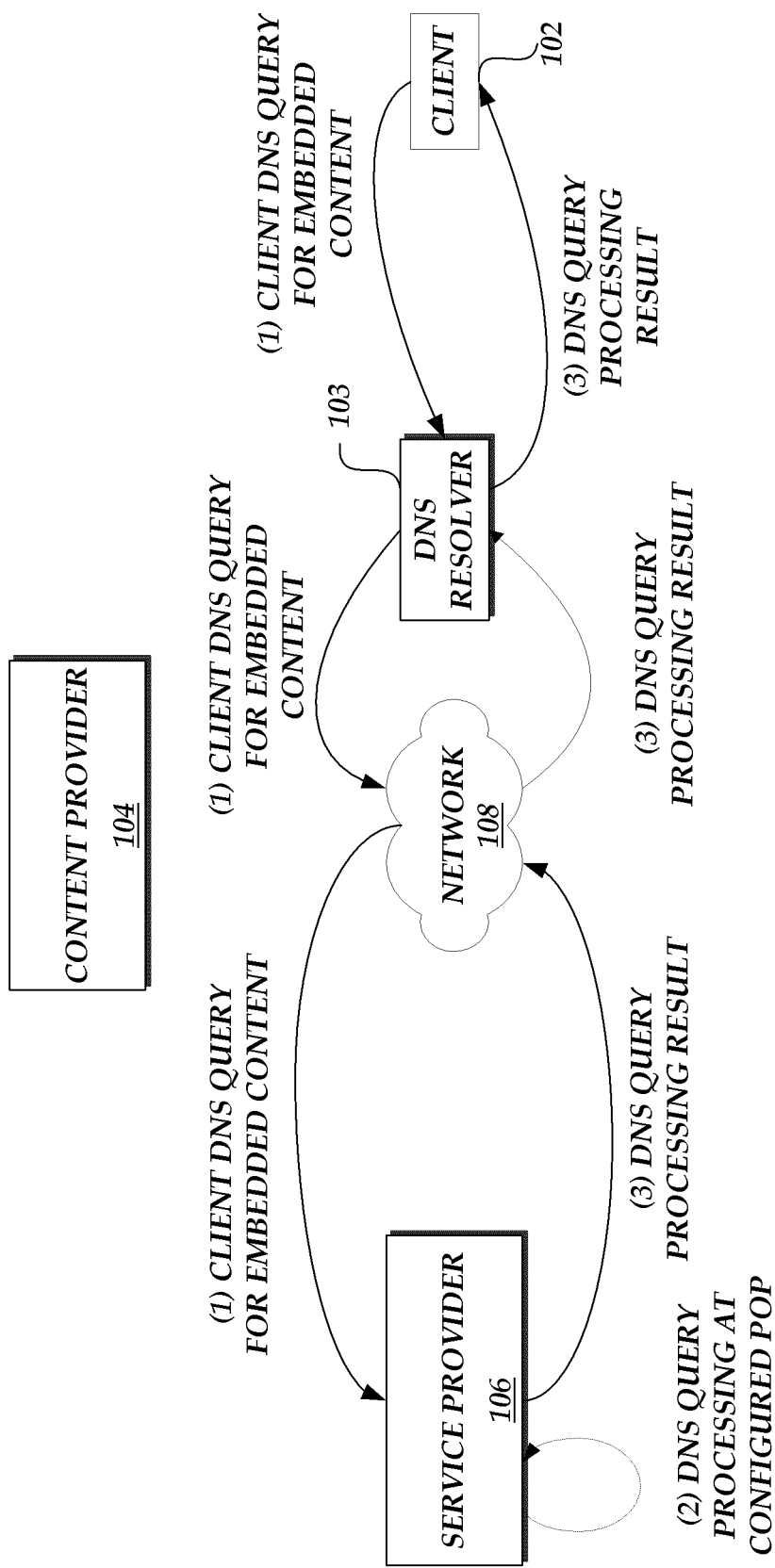
Figure 3C:
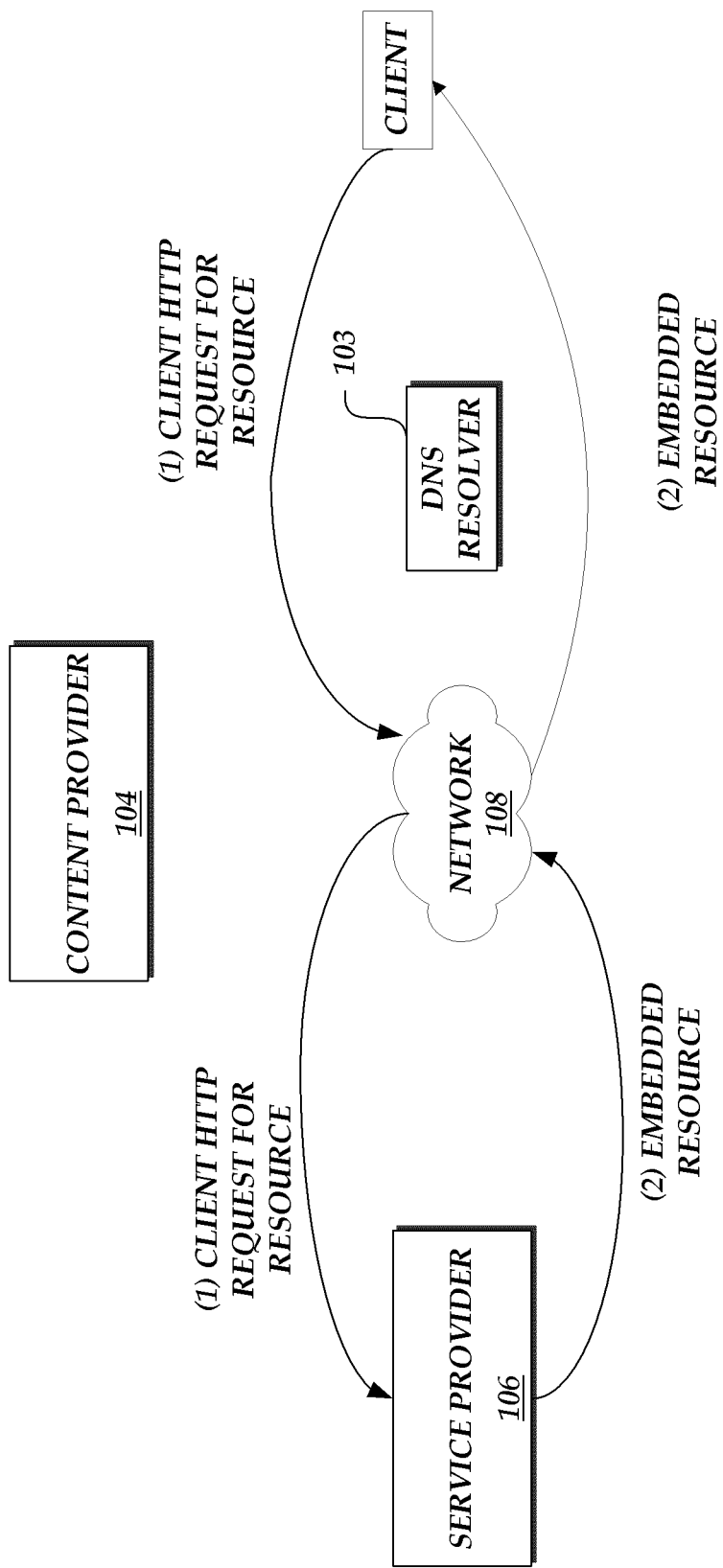
Figure 4:
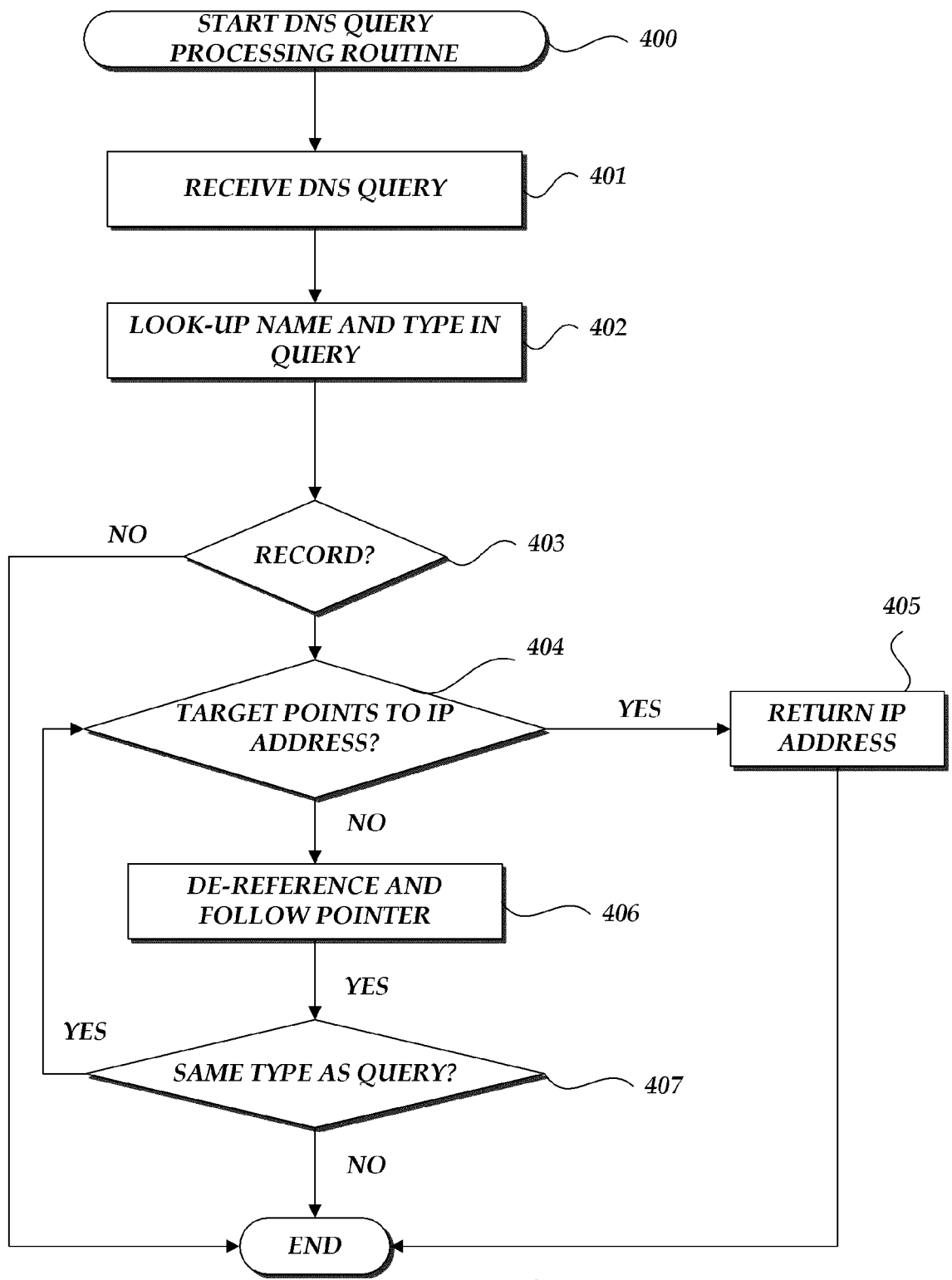
FIG. 4 is a flow diagram illustrative of a DNS query processing routine implemented by a service provider.

With reference now to FIGS. 2-4, the interaction between various components of the content delivery environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Figure 2A:
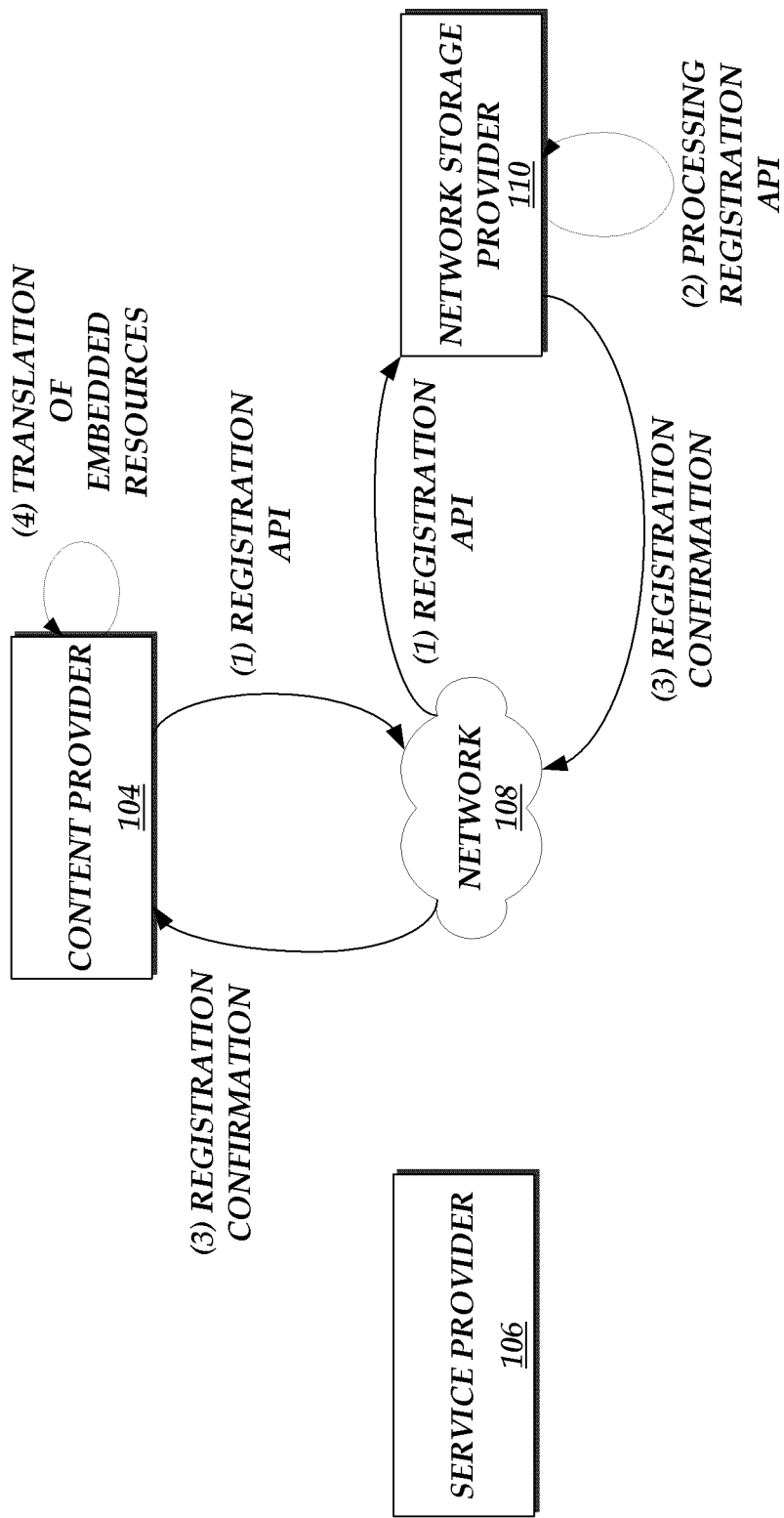
FIG. 2A is a block diagram of the content delivery environment of FIG. 1 illustrating the registration of a content provider with a network storage provider.

With reference to FIG. 2A, an illustrative interaction for the optional registration of a content provider 104 with the network storage provider 110 for hosting content on behalf of the content provider 104 will be described. As illustrated in FIG. 2A, the storage provider content registration process begins with registration of the content provider 104 with the network storage provider 110. In an illustrative embodiment, the content provider 104 utilizes a registration application program interface ("API") to register with the network storage provider 110 such that the network storage provider 110 can provide content on behalf of the content provider 104. The registration API can include the identification of the origin server 114 of the content provider 104 that may provide requested resources to the network storage provider 110. In addition or alternatively, the registration API can include the content to be stored by the network storage provider 110 on behalf of the content provider 104. In one embodiment, the network storage provider 110 may act as an origin server for the content provider 104.

With continued reference to FIG. 2A, upon receiving the registration API, the network storage provider 110 obtains and processes the content provider registration information. In an illustrative embodiment, the network storage provider 110 can then generate additional information that will be used by the client computing devices 102 as part of the content requests. The additional information can include, without limitation, content provider identifiers, such as content provider identification codes, storage provider identifiers, such as storage provider identification codes, executable code for processing resource identifiers, such as script-based instructions, and the like. One skilled in the relevant art will appreciate that various types of additional information may be generated by the network storage provider 110 and that the additional information may be embodied in any one of a variety of formats.

In one embodiment, the network storage provider 110 returns an identification of applicable domains for the network storage provider (unless it has been previously provided) and any additional information to the content provider 104. In turn, the content provider 104 can then process the stored content with content provider specific information. In one example, as illustrated in FIG. 2A, the content provider 104 translates resource identifiers originally directed toward a domain of the origin server 114 to a domain corresponding to the network storage provider 110. The translated URLs are embedded into requested content in a manner such that DNS queries for the translated URLs will resolve to a DNS server corresponding to the network storage provider 110 and not a DNS server corresponding to the content provider 104. As will be explained in greater detail below, in some embodiments, the translated URLs correspond to resource record set aliases, that is, the DNS server corresponding to the network storage provider 110 may be configured to resolve the translated URLs to a target (containing a target name and hosted zone) as opposed to an IP address.

Figure 2B:
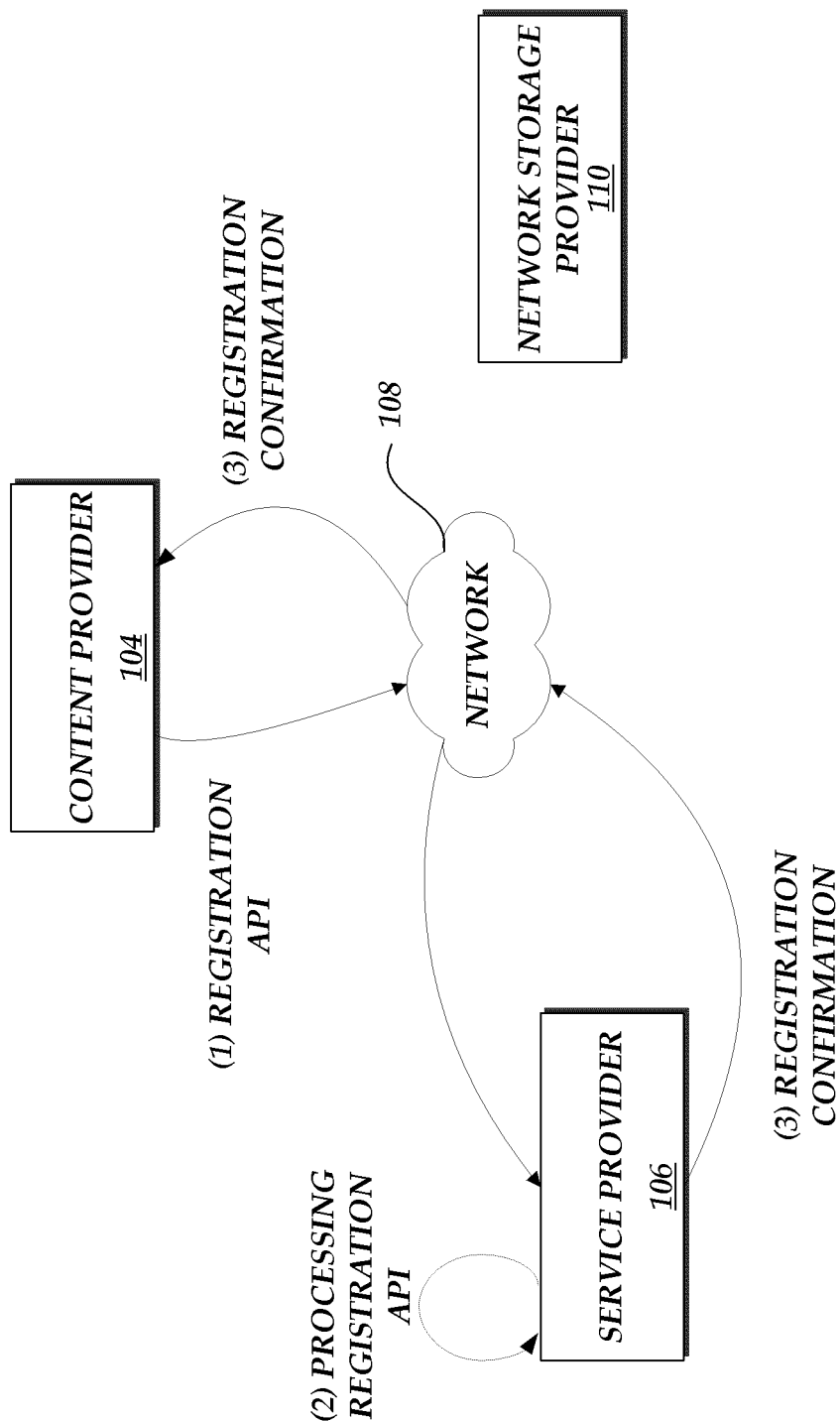
FIG. 2B is a block diagram of the content delivery environment of FIG. 1 illustrating the registration of an alias resource record with a service provider.

With reference now to FIG. 2B, an illustrative interaction for registration, by the content provider 104, to utilize the request routing services provided by the service provider 106 will be described. As illustrated in FIG. 2B, the request routing service registration process provided by the service provider 106 begins with registration of the content provider 104 with the service provider 106. In an illustrative embodiment, the content provider 104 utilizes a registration API to register with the service provider 106 such that the service provider 106 can provide request routing services on behalf of the content provider 104. The registration API includes the identification of the domains for which the service provider 106 will be authoritative (e.g., "contentprovider.com"), the identification of the storage component 140, 144 of the network storage provider 110 or origin servers 114 that will provide requested resources to the client computing devices 102. The registration API can also include additional information including request routing information, identification information, or other information that will be used to resolve client computing device DNS requests on behalf of the content provider 104, as will be explained below.

The service provider 106 obtains the registration API and processes the information. In one aspect, the service provider 106 can generate the necessary request processing rules or alternative identifiers that may be utilized in the resolution of client computing device DNS queries. In another aspect, the service provider 106 can cause the registration of its DNS nameserver components for the relevant domains specified by the content provider 104. The service provider 104 can then send a response to the content provider 104, such as a confirmation. Responsive to the processing of the registration API, the service provider 106 can identify the network addresses of the service provider DNS servers, such as an Internet Protocol address, that will process DNS queries on behalf of the content provider 104. The content provider 104 can then delegate the identified network addresses of the DNS servers that will be responsible for the identified content provider domain (e.g., "contentprovider.com").

With continued reference to FIG. 2B, upon receiving the registration API, the service provider 106 may process the registration information. In one embodiment, the service provider 106 may extract or generate information utilized to resolve DNS queries to the registered domain. Examples include the association of one or more network addresses (e.g., IP addresses) or Canonical Name records ("CNAMEs") that can be utilized to resolve a DNS query corresponding to the registered domain. In some embodiments, the service provider 106 may generate additional information that will be used to facilitate efficient response to DNS queries. The additional information may include, without limitation, content provider identifiers, storage provider identifiers, executable code for processing DNS queries, such as script-based instructions, and the like. In other embodiments, the service provider 106 can generate one or more alias records that reference information associated with another domain. In this embodiment, the service provider 106 would not generate or obtain network address information or CNAMEs that could be utilized to resolve the DNS query to the registered domain. Rather, the service provider 106 can utilize information included in the registration or other information generated/obtained by the service provider to reference another domain for purposes of request routing.

With reference to FIG. 3A, an illustrative interaction for the processing of request from the client 102 for webpage provided by the content provider 104 will be described. As shown in FIG. 3A, the client 102 may request a webpage from the content provider 104 with embedded resources. Specifically, in accordance with DNS routing principles, a client computing device DNS query corresponding to a resource identifier would eventually be resolved by identifying a network address corresponding to either the origin server component 114 and associated storage component 116 or storage component 140, 144, 148 of the network storage provider 110 by a DNS nameserver associated with the service provider 106.

In one embodiment, a client computing device 102 issues a DNS query for the content provider domain (e.g., "contentprovider.com"). Illustratively, the first client computing device 102, such as through a browser software application, issues a DNS query to an associated DNS resolver component 103. On behalf of the client computing device 102, the associated DNS resolver components 103 issues a DNS query for the content provider domain that first results in the identification of a DNS server authoritative to the "." and the "com" portions of the domain. After partially resolving the domain according to the "." and "com" portions of the domain, the DNS resolver components 103 then issues another DNS query for the URL that results in ".contentprovider" portion of the domain. In certain embodiments, the DNS resolver components 103A may already been configured with the network addresses of the DNS server components and would utilize the configured network address information so long as the configured network address information would be considered valid and applicable.

In an illustrative embodiment, the identification of the identification of a DNS server authoritative to the "contentprovider" corresponds to one of the first set of assigned IP addresses of a DNS server associated with the service provider 106. In one embodiment, the IP address is a specific network address unique to DNS server component(s) of a specific POP associated with the service provider 106. In another embodiment, the IP address can be shared by one or more POPs associated with the service provider 106, which may be geographically or logically distributed. In this embodiment, a DNS query to the shared IP address utilizes a one-to-many network routing schema, such as anycast, such a specific POP will receive the request as a function of network topology. For example, in an anycast implementation, a DNS query issued by the DNS resolver components 103A to a shared IP address will arrive at a DNS server component of the service provider 106 logically having the shortest network topology distance, often referred to as network hops, from the client computing device. The network topology distance does not necessarily correspond to geographic distance. However, in some embodiments, the network topology distance can be inferred to be the shortest network distance between a client computing device 102 and a service provider POP.

As illustrated in FIG. 3A a DNS server component of the content provider 106 obtains the DNS query and can resolve the DNS query by providing a network address, such as an IP address, of a component for providing the request content. For example, the receiving DNS server component may provide an IP address of a Web server that can provide a requested Web page. In another example, the DNS server may provider an IP address of a cache component that may provide a request resource or file. In an alternative embodiment, the DNS server component may also provide alternative identifiers, such as CNAMES that can be used to refine request routing processing. In the example illustrated in FIG. 3A, it is assumed that the DNS query transmitted by the client computing device 102 can be processed.

Turning now to FIG. 3B, an illustrative interaction for the processing of DNS requests from the client 102 for embedded content of the webpage provided by the content provider 104 will be described. For the embedded content, the client 102 may submit a DNS query. The DNS query may be handled by the DNS resolver 103 as described above. The DNS resolver 103 may find that a DNS server component 122, 128, 134 is authoritative for processing the embedded resource.

With continued reference to FIG. 3B, the DNS resolver may transmit the DNS query to DNS server component. In this example, the DNS query would correspond to the domain identified for the embedded content (e.g., www.cdnprovider.com). In accordance with traditional DNS principles, the DNS server component of the service provider 106 would then process the DNS query in an attempt to resolve the DNS query. One skilled in the relevant art will appreciate that resolution of the DNS query corresponds to the return of an IP address or CNAME that is authoritative for the domain name identified in the DNS query. In one aspect, in order to process the received DNS query, the DNS server component would attempt to identify network address information or CNAME information that is associated with the domain identified in the DNS query. If such information exists, the DNS server component may be able to resolve the DNS query with such information.

In another aspect, the DNS server component (or associated components) may be configured with one or more references, or alias records, that reference information associated with another domain. In such embodiments, the DNS resolver component would utilize the information associated with the referenced domain to resolve the DNS query. For example, the information associated with the referenced domain may correspond to a network address or CNAME that can be utilized to be responsive to the DNS query. In another example, the information associated with the referenced domain may include references to other domains. In other embodiments, the DNS server component may be able to utilize additional criteria to select from various references associated with a domain. For example, the DNS server component can utilize client identifier information parsed from the received domain (e.g., clientidentifier.cdnprovider.com) to select from two or more potential references. An illustrative routine for processing DNS queries utilizing one or more references, or alias records, is discussed below with respect to FIG. 4. Once the DNS server component processes the DNS query, the DNS query processing result may be returned to the client computing device. The DNS query result contains the IP address for the server hosting the embedded content.

Although FIG. 3B discusses, by way of example, interactions for the processing of DNS requests from the client 102 for embedded content of a webpage, one skilled in the relevant art will appreciate that interactions described in FIG. 3B may be applied to any application that may have a need to resolve DNS requests such as network chat applications, email clients, distributed gaming applications, voice over IP applications, video chat applications, general client-server applications or general distributed computing applications, etc.

Turning now to FIG. 3C, an illustrative interaction for the processing of HTTP requests for an embedded resource will be described. Once the client computing device receives the DNS query result containing the IP address for the requested domain name, subsequent requests to the service provider 106 will be made via HTTP requests specifying the IP address, thereby bypassing the DNS resolver 103 and the DNS server 122, 128, 134 of the service provider 106. Embedded resources may be returned as a result of the HTTP request made by the client 102.

With reference now to FIG. 4, one embodiment of a routine 400 implemented by a service provider 106 for processing a DNS query will be described. One skilled in the relevant art will appreciate that actions/steps outlined for routine 400 may be implemented by one or many computing devices/components that are associated with the service provider 106, such as a DNS query processing component or a point of presence associated with the service provider. Accordingly, routine 400 has been logically associated as being generally performed by the service provider 106, and thus the following illustrative embodiments should not be construed as limiting.

At block 401, the service provider 106 receives a DNS query request on behalf of a content provider 104. Illustratively, the DNS query request may be received by a DNS Resolver 103. The DNS resolver may have received the DNS query from a client 102. The DNS query may include a query name, for example "www.contentprovider.com", and DNS query type, such as "A", for example.

Processing then moves to block 402 where DNS server 122, 128, 134 may look-up the name and type specified in the query in resource cache 124, 130, 136 to determine if an alias record exists for the name and type. Resource cache 124, 130, 136 may advantageously maintain a table of alias records. The table of alias records may contain, for example, an alias name, an alias type and a target. In one embodiment, the alias name and the alias type combination may be unique within the table of alias records, that is, only one target may be associated with an alias name and alias type. Thus, as DNS server 122, 128, 134 searches the table of alias records for a row in the table where the alias name matches the name and type specified in the DNS query, there may be only one matching target.

At block 403, the DNS server 122, 128, 134 determines, based on the look-up of an alias record exists matching the query. If a record exists processing moves to block 404. If a record does not exist, the DNS server 122, 128, and 134 may, in some embodiments, return an error message to the DNS resolver 103 indicating that the DNS query could not be resolved.

At block 404, the DNS server 122, 128, 134 determines if the target value of the matching alias record points to information that is responsive to the DNS query. For example, the information responsive to the DNS query may be a network address, which is generally referred to as information utilized to resolve the DNS query. Examples of such network address information can include, but is not limited to, network addresses corresponding to an IPv4 address schema or an IPv6 address schema. The information responsive to the DNS query may also correspond to a resource record type that is not an IP address such as an AFS database record ("AFSDB"), CNAME records, a delegation name record ("DNAME"), a MX record, a name server record ("NS"), or a text record ("TXT"), and the like. In other embodiments, the target value may be a pointer value that points to another alias record stored in the table of alias records of the resource cache connected to the DNS server. If the DNS server 122, 128, 134 determines the target value is an IP address, the DNS server answered the DNS query with the IP address, thereby resolving the query. If, however, the DNS server determines that that target value is not an IP address, processing continues to box 406.

At box 406, the DNS server 122, 128, 134 dereferences and follows the pointer in the target value. In some embodiments, the target value may be a unique primary key value that points to another row in the alias record table of the resource cache 124, 130, 136. Alternatively, the target value may be an alias name and alias type of another alias record stored in the alias record table of the resource cache connected to the DNS server. In some embodiments, the target value may not point to alias record stored in the alias record table of the resource cache connected to the DNS server, but rather, may point to an alias record stored in the alias record table of a different DNS server located at another POP of the service provider 106. In such embodiments, the target value may provide an indication of the resource cache storing the alias record.

The DNS server 122, 128, 134 may then follow the pointer to the next alias record, and then, at box 407 may validate that the pointed to, or target, alias record is of the same type as the DNS query. If the DNS server 122, 128, 134 determines that the pointed to alias record is not of the same type, it may return an error to the DNS resolver 103 indicating that the DNS query could not be resolved. If the DNS server 122, 128, 134 determines that the pointed to alias record is of the same type, processing proceeds to box 404. The pointed to alias record is then processed in a way similar as described above.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing DNS queries, the system comprising:
   a processor;
   a data store comprising a plurality of data records, wherein individual data records comprise a name and a record value;
   a non-transitory computer readable medium storing software instructions that when executed cause the processor to:
      obtain a DNS query corresponding to a request from a client computing device, wherein the DNS query comprises a requested domain name;
      access a first data record of the plurality of data records in the data store associated with the requested domain name;
      determine whether a first record value of the first data record comprises information responsive to the DNS query;
      based on a determination that the first record value does not comprise information responsive to the DNS query and that the first record value comprises a reference to a second data record, access the second data record based, at least in part, on the first record value and determine whether a second record value of the second data record comprises information responsive to the DNS query; and
      if it is determined that the second record value comprises information responsive to the DNS query, resolve the DNS query by transmitting the information responsive to the DNS query to the client computing device.

2. The system of claim 1, wherein the software instructions when executed further cause the processor to:
   if it is determined that the second record value does not comprise information responsive to the DNS query, access the second record value to determine one or more data records such that at least one of the one or more data records comprises a record value comprising information responsive to the DNS query, and
   resolve the DNS query by transmitting the information responsive to the DNS query to the client computing device.

3. The system of claim 1, wherein the first record value comprises a primary key that uniquely identifies the second data record.

4. The system of claim 1, wherein the information responsive to the DNS query corresponds to an Internet Protocol address.

5. The system of claim 1, wherein the information responsive to the DNS query corresponds to a CNAME.

6. The system of claim 1, wherein the DNS query corresponds to an embedded resource hosted in a content delivery environment.

7. The system of claim 1, wherein the DNS query corresponds to a request made for at least one of: a network chat application, an email client, a distributed gaming application, a voice over IP application, a video chat application, a general client-server application, or a general distributed computing application.

8. The system of claim 1, wherein the software instructions when executed further cause the processor to determine whether the second data record is a same type as a type of the DNS query.

9. A method for managing DNS queries, comprising:
   receiving, by a computing device, a DNS query comprising a query name;
   accessing, by the computing device, a data store comprising a plurality of data records, wherein each of the plurality of data records comprises a name and a record value;
   identifying, by the computing device, a first data record of the plurality of data records by matching the query name to a name associated with the first data record;
   determining, by the computing device, whether a first record value of the first data record comprises information responsive to the DNS query;
   based on a determination that the first record value of the first data record does not comprise information responsive to the DNS query and that the first record value comprises a reference to a second data record, determining, by the computing device, whether the second data record comprises a second record value responsive to the DNS query; and based on a determination that the second record value is responsive to the DNS query, resolving, by the computing system, the DNS query by transmitting the second record value responsive to the DNS query to the client computing device.

10. The method of claim 9, wherein the second record value corresponds to a network address.

11. The method of claim 9, wherein the second record value corresponds to a CNAME.

12. The method of claim 9, wherein the first record value of the first data record comprises a primary key uniquely identifying the second data record from the plurality of data records.

13. The method of claim 9 further comprising:
if it is determined that that the second record value does not comprise information responsive to the DNS query, continuing to access record values of one or more data records until at least one data record comprises a record value responsive to the DNS query.

14. The method of claim 9, wherein the DNS query corresponds to an embedded resource hosted in a content delivery environment.

15. A non-transitory computer readable medium storing software instructions that when executed cause a computer system to perform a method comprising:
receiving a DNS query comprising query information;
accessing a first data record from a plurality of data records stored in a data store based on the query information;
determining whether a first record value of the first data record comprises information responsive to the DNS query;

based on a determination that the first record value of the first data record does not comprise information responsive to the DNS query and that the first record value comprises a reference to a second data record, determining whether the second data record comprises a second record value responsive to the DNS query; and based on the determination that the second resolution information is responsive to the DNS query, resolving the DNS query by transmitting the second resolution information responsive to the DNS query.

16. The computer readable medium of claim 15, wherein the second record value corresponds to a network address.

17. The computer readable medium of claim 15, wherein the first record value references a second data record stored in a different DNS server.

18. The computer readable medium of claim 15, wherein the first record value comprises a key identifying the second data record from the plurality of data records.

19. The computer readable medium of claim 15, wherein the DNS query corresponds to a request made for at least one of: a network chat application, an email client, a distributed gaming application, a voice over IP application, a video chat application, a general client-server application, or a general distributed computing application.

20. The computer readable medium of claim 15, wherein the DNS query corresponds to an embedded resource hosted in a content delivery environment.

* * * * *